United States Patent
Farrugia et al.

(10) Patent No.: US 9,068,041 B2
(45) Date of Patent: *Jun. 30, 2015

(54) POLYESTER EA TONER COMPRISING FURAN

(71) Applicant: Xerox Corporation, Nowalk, CT (US)

(72) Inventors: Valerie M Farrugia, Oakville (CA); Guerino G Sacripante, Oakville (CA); Ke Zhou, Oakville, CA (US); Sonja Hadzidedic, Oakville (CA)

(73) Assignee: Xerox Corporation, Norwalk, CT (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/718,535

(22) Filed: Dec. 18, 2012

(65) Prior Publication Data

US 2014/0170547 A1 Jun. 19, 2014

(51) Int. Cl.
| | | |
|---|---|---|
| *C08G 63/48* | (2006.01) | |
| *C08G 63/181* | (2006.01) | |
| *G03G 9/087* | (2006.01) | |
| *G03G 9/093* | (2006.01) | |
| *G03G 9/08* | (2006.01) | |

(52) U.S. Cl.
CPC .......... *C08G 63/181* (2013.01); *G03G 9/0819* (2013.01); *G03G 9/0827* (2013.01); *G03G 9/08755* (2013.01); *G03G 9/08795* (2013.01); *G03G 9/08797* (2013.01); *G03G 9/09371* (2013.01)

(58) Field of Classification Search
CPC .... C08G 63/553; C08G 63/137; C08G 63/00; C08G 63/18; C08G 63/66; C08G 63/672; C08G 63/78

USPC .............. 528/292.5, 298, 307, 295.5
See application file for complete search history.

(56) References Cited

U.S. PATENT DOCUMENTS

| 8,574,803 | B2 * | 11/2013 | Sacripante et al. | 430/109.4 |
| 8,765,345 | B2 * | 7/2014 | Zhou et al. | 430/109.4 |
| 2011/0071238 | A1 | 3/2011 | Bastioli et al. | |
| 2013/0171555 | A1 | 7/2013 | Kubo et al. | |
| 2013/0273467 | A1 | 10/2013 | Ashizawa et al. | |

FOREIGN PATENT DOCUMENTS

| JP | 2012-207193 | * 10/2012 |
| JP | 2012-226261 | * 11/2012 |

OTHER PUBLICATIONS

Clements "Reactive Applications of Cyclic Alkylene Carbonates"—Jan 15, 2003.*
Thomas Pasini et al. "Selective oxidation of 5-hydroxymethyl-2-furfural using supported gold—copper nanoparticles" Green Chem., 2011, 13,pp. 2091-2099; Published Jul. 8, 2011.*

* cited by examiner

*Primary Examiner* — Ling Choi
*Assistant Examiner* — Gennadiy Mesh
(74) *Attorney, Agent, or Firm* — MDIP LLC

(57) ABSTRACT

Methods of making a bio-based polyester resin by polycondensing a polyol with a polyacidic furan are described. The polyol can be a rosin diol obtained by reacting a rosin acid and a glycerol carbonate. The polyacidic furan is obtained from a bio-based product. The resin may be used in manufacturing toner for imaging devices.

9 Claims, No Drawings

POLYESTER EA TONER COMPRISING FURAN

FIELD

This disclosure is generally directed to toner preparation processes, such as emulsion aggregation processes, and toner compositions formed by such processes, comprising a bio-based polyester resin comprising a furan monomer.

BACKGROUND

Emulsion aggregation (EA) toner particles may comprise polyester resins, which resins are used to make polymer particles, where the particles are aggregated to form structures of a desired size, followed by the coalescence of the aggregated particles, for example, at an elevated temperature to obtain the desired shape and size. Examples of teachings of materials and methods for making EA toner include U.S. Pat. Nos. 5,290,654; 5,344,738; 5,346,797; 5,496,676; 5,501,935; 5,747,215; 5,840,462; 5,869,215; 6,828,073; 6,890,696; 6,936,396; 7,037,633; 7,049,042; 7,160,661; 7,179,575; 7,186,494; 7,217,484; 7,767,376; 7,829,253; 7,858,285; and 7,862,971, the disclosure of each of which hereby is incorporated by reference in entirety.

With an increased focus on environmental and health, there is an interest and/or a need to find suitable reagent replacements to reduce health risks and reliance on petroleum-based reagents associated with toner production and use. It is desirable, then, to employ products that have a lower negative impact on the health, and at the same time provide suitable reagents for polymer resin design that are useful in EA toners.

SUMMARY

The instant disclosure provides a bio-based polyester resin comprising a polyacidic furan moiety which may be used in manufacturing toner for imaging devices, including the manufacture of such polyester resin which increases the bio-based content of a resin. The process as disclosed does not require and/or minimizes the use of petroleum-based monomers, such as, TPA, BPA or IPA.

In embodiments, a method of making a bio-based polyester resin is disclosed comprising a bio-based polyol with a polyacidic furan, optionally, in the presence of a catalyst, to form a bio-based polyester resin, in whole or in part.

In embodiments, a method for making a toner is disclosed including mixing a composition containing a bio-based polyester resin, an optional crystalline resin emulsion, an optional wax dispersion, and an optional color pigment dispersion, where the bio-based resin is made from a polyacidic furan and a polyol, which may be bio-based, optionally in the presence of a catalyst to form a bio-based resin, in whole or in part; optionally adding a flocculent to the composition; aggregating the particles; optionally adding a resin, such as, a second portion of the bio-based polyester resin to form a shell; optionally coalescing the particles; and recovering the toner particles.

DETAILED DESCRIPTION

Introduction

The disclosure describes the use of polyacidic furan derivatives (e.g., 2,5-furan dicarboxylic acid (FDCA), dimethyl-3,4-furan dicarboxylic acid, and the like) in a toner resin. FDCA, also known as dehydromucic acid, is an oxidized furan derivative. The compound may be made based on the acid-promoted triple dehydration of aldaric (mucic) acids. The reaction requires severe conditions (highly concentrated acids, temperature>120° C., reaction time>20 h). Alternatively, synthesis routes include an oxidation reaction comprising any of a variety of 2,5-disubstituted furans utilizing a variety of inorganic oxidants. Several routes to FDCA via oxidation of hydroxymethylfurfural (HMF) with air over different catalysts have been reported. A third route includes reactions describing the synthesis of FDCA from furfural. Furfural can be oxidized to 2-furoic acid with nitric acid and the latter may be subsequently converted to the methyl ester. The ester then can be converted via a chloromethylation reaction, such as, at position 5 to give 5-chloromethylfuroate. The latter is oxidized with nitric acid to form dimethyl 2,5-furandicarboxylate, which, after alkaline hydrolysis gives FDCA. See, for example, Gomes et al., J. Poly. Sci. Part A, 49 (17) 3759-3768, 2011; Gandini & Gelgacem, Prog. Poly. Sci. 22:1203-1379, 1997; and Gallezot, Catal. Renewables, Centi & van Santen, eds., Wiley, Weinheim, 2007, p 53-73. Recently, the enzyme, furfural/HMF oxidoreductase, was isolated from the bacterium, *Cupriavidus basilensis* HMF, Koopman et al., PNAS 107:4919-4924, 2010. The enzyme converts HMF to FDCA using molecular oxygen. A *Pseudomonas putida* strain was genetically engineered to express that enzyme and can completely and selectively convert HMF to FDCA. The biocatalysis is performed in water, at ambient temperature and pressure, and without toxic or polluting chemicals. FDCA provides a substituted diol with aromatic character that may be incorporated into toner resins as a component for increasing glass transition temperature (Tg). The resulting toner resins have properties similar to those made using conventional materials.

FDCA may be produced from fructose, where fructose is dissolved in an acetone-water solution and mixed with a catalytic amount of sulfuric acid. Heat and pressure are applied to the reaction mixture and the fructose dehydrogenates to 5-hydroxymethylfurfural. 5-Hydroxymethylfurfural may then be oxidized to 2,5-furan dicarboxylic acid. The 2,5-furan dicarboxylic acid monomer then can be used as one of the reagents to synthesize a bio-based polyester resin.

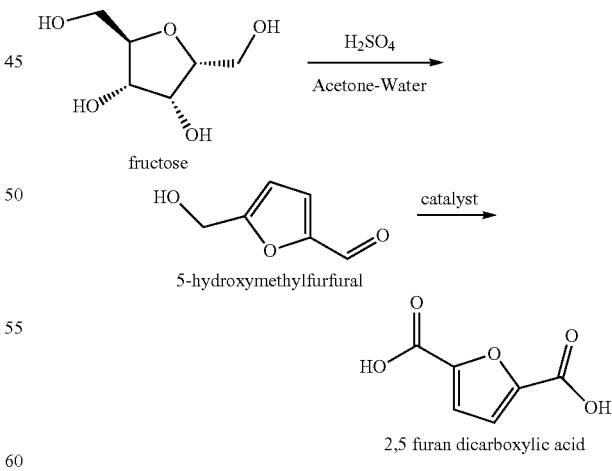

In embodiments, the bio-based polyester resin exhibits good transition of viscosity from low to high temperatures, which is characteristic of amorphous resins for EA toner.

The present disclosure provides a polyester resin comprising a polyacidic furan derivative that may be used to produce polyester toner particles, toners, developers comprising said toner particles, devices comprising said toner particles or said developers, imaging devices comprising said developers, imaging device components comprising said developers, systems which include such toner particles or developers, and so on.

Unless otherwise indicated, all numbers expressing quantities and conditions, and so forth used in the specification and claims are to be understood as being modified in all instances by the term, "about." "About," is meant to indicate a variation of no more than 20% from the stated value. Also used herein is the term, "equivalent," "similar," "essentially," "substantially," "approximating" and, "matching," or grammatical variations thereof, have generally acceptable definitions or at the least, are understood to have the same meaning as, "about."

In the application, use of the singular includes the plural unless specifically stated otherwise. In the application, use of, "or," means, "and/or," unless stated otherwise. Furthermore, use of the term, "including," as well as other forms, such as, "includes," and, "included," is not limiting.

For the purposes of the instant disclosure, "toner," "developer," "toner composition," and "toner particles," may be used interchangeably, and any particular or specific use and meaning will be evident from the context of the sentence, paragraph and the like in which the word or phrase appears.

As used herein, "bio-based," means a commercial or industrial product (other than food or feed) that is composed, in whole or in substantial part (e.g., at least about 50%, at least about 60%, at least about 70%, at least about 80%, at least 90% by weight of the resin), of biological products or renewable domestic agricultural materials (including plant, animal, and marine materials) or forestry materials. Generally, a bio-based material is biodegradable, that is, substantially or completely biodegradable, by substantially is meant greater than 50%, greater than 60%, greater than 70% or more of the material is degraded from the original molecule to another form by a biological or environmental means, such as, action thereon by bacteria, animals, plants and so on in a matter of days, matter of weeks, a year or more.

A, "polyacid," is a monomer for forming a polyester polymer for toner that comprises at last two reactive acidic groups, such as, a carboxylic acid group, at least three acidic groups or more. Hence, a diacid, a triacid and so on are encompassed by a polyacid.

A, "polyol," is a monomer for forming a polyester polymer for toner that comprises at least two reactive hydroxyl groups, such as, an alcohol, at least three hydroxyl groups or more. Hence, a dialcohol or diol, a trialcohol or triol and so on are encompassed by a polyol.

Resins and Polymers

Polyesters may be obtained by the polycondensation of a polyacid with a polyol, such as, FDCA and a rosin diol, including an additional polyacid and/or polyol.

FDCA may be obtained from fructose. Fructose, or fruit sugar, is a simple monosaccharide found in many plants. Pure, dry fructose is an odorless, crystalline solid that is the most water-soluble of all sugars. From plant sources, fructose is found in honey, tree and vine fruits, flowers, berries and most root vegetables. In plants, fructose may be present as the monosaccharide and/or as a component of sucrose. Commercially, fructose is usually derived from sugar cane, sugar beets and corn.

Fructose can be dissolved in an acetone-water solution and mixed with a catalytic amount of sulfuric acid. Heat and pressure are applied and the fructose dehydrogenates to 5-hydroxymethylfurfural. 5-Hydroxymethylfurfural may then be oxidized to 2,5-furan dicarboxylic acid.

A polyester polymer can contain other polyacid and polyol monomers as known in the art.

Examples of polyacids or polyesters that can be used include terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate, and combinations thereof.

Examples of polyols which may be used include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene glycol and combinations thereof.

Polycondensation catalysts include tetraalkyl titanates, such as, titanium (iv) butoxide or titanium (iv) iso-propoxide; dialkyltin oxides, such as, dibutyltin oxide; tetraalkyltins, such as, dibutyltin dilaurate; dialkyltin oxide hydroxides, such as, butyltin oxide hydroxide, tetraisopropyl orthotitanate, tetrabutyl orthotitanate monobutyl tin oxide and dibutyl tin oxide; aluminum alkoxides; alkyl zinc; dialkyl zinc; zinc oxide; stannous oxide; and combinations thereof. The catalysts may be used in amounts of, for example, from about 0.001 mol % to about 0.55 mol % based on the starting polyacid or polyester used to generate the polyester resin. In embodiments, the catalysts may be FASCAT 4100, FASCAT 4350, FASCAT 9100.

In embodiments, polycondensation temperatures range from about 150° to 250° C., in embodiments, from about 185° C. to about 215° C. Excess polyol monomer may be removed under generated vacuum. Total reaction times may range from about 1 to about 5 hours.

The bio-based polyester resin may be present, for example, in an amount of from about 5 to about 100 wt % of the toner components, such as, for example, from about 10 to about 75 wt % of the toner components. The bio-based polyester resin may have a number average molecular weight (Mn), as measured by gel permeation chromatography (GPC) of, for example, from about 1,000 to about 50,000, such as, from about 2,000 to about 25,000, and a weight average molecular weight (Mw) of, for example, from about 2,000 to about 100,000, such as, from about 3,000 to about 14,000, as determined by GPC using polystyrene standards. The molecular weight distribution (Mw/Mn) of the bio-based polyester resin may be, for example, from about 2.5 to about 9, from about 1.5 to about 4, from about 1 to about 6.

The bio-based polyester resin may have a Tg of, for example, from about 10° C. to about 120° C., from about 20° C. to about 115° C., from about 30° C. to about 110° C.

The bio-based polyester resin may have a softening point (Ts) of, for example, from about 90° C. to about 150° C., from about 95° C. to about 145° C., from about 100° C. to about 140° C. Different softening points may produce toners exhibiting different gloss levels. For example, in embodiments, a bio-based polyester resin having a softening point of about 100° C. can be used to produce toners having a higher gloss than toners produced with resins having a softening point of 105° C. or higher.

The bio-based polyester resin may have an acid value from about 2 to about 30 mg KOH/g, from about 4 to about 25 mg KOH/g, from about 6 to about 20 mg KOH/g.

In embodiments, the amount of furan in the polymer can be adjusted to obtain polymer with desired characteristics. Hence, the ratio of furan to polyol in a polymer can be 1:1 on a molar basis. In embodiments, the ratio can be from about 1.5:1 to about 1:1.5, from about 1.4:1 to about 1:1.4, from about 1.3:1 to about 1:1.3, from about 1.2:1 to about 1:1.2, although ratios outside of those ranges can be used as a design choice.

Other Resin Materials

In addition to the bio-based polyester resin described above, the toner compositions may further comprise one or more additional resin materials, to provide desired results. The one or more additional resin materials can be, for example, amorphous, semi-crystalline or crystalline, and can be derived either from petroleum sources or can be a bio-based resin from renewable sources. The one or more additional resin materials can be an acrylate-based resin, a styrene-based resin, a polyester-based resin or the like. Numerous suitable such resins are described in the various patent references cited and incorporated by reference herein, and as known in the art.

Examples of semi-crystalline resins which may be utilized include polyesters, polyamides, polyimides, polyisobutyrate and polyolefins, such as, polyethylene, polybutylene, ethylene-propylene copolymers, ethylene-vinyl acetate copolymers, polypropylene, combinations thereof, and the like.

In embodiments, semi-crystalline resins which may be utilized may be polyester-based, such as, polyhydroxyalkanoates having the formula:

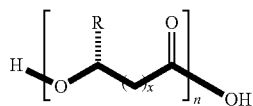

wherein R is independently H or a substituted or unsubstituted alkyl group of from about 1 to about 13 carbon atoms, in embodiments, from about 3 to about 10 carbon atoms, X is from about 1 to about 3, and n is a degree of polymerization of from about 50 to about 20,000, from about 100 to about 15,000.

In embodiments, R can be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, such as those having from about 1 to about 20 carbon atoms, in embodiments, from about 2 to about 10 carbon atoms; aryloxy groups, such as those having from about 6 to about 20 carbon atoms, in embodiments, from about 6 to about 10 carbon atoms; alkylthio groups, such as those having from about 1 to about 20 carbon atoms, in embodiments, from about 1 to about 10 carbon atoms; arylthio groups, such as those having from about 6 to about 20 carbon atoms, in embodiments, from about 6 to about 10 carbon atoms; aldehyde groups; ketone groups; ester groups; amide groups; carboxylic acid groups; sulfonic acid groups; combinations thereof and the like.

Suitable polyhydroxyalkanoate resins include polyhydroxybutyrate (PHB), polyhydroxyvalerate (PHV) and copolyesters containing randomly arranged units of 3-hydroxybutyrate (HB) and/or 3-hydroxyvalerate (HV), such as, poly-beta-hydroxybutyrate-co-beta-hydroxyvalerate, and combinations thereof. Other suitable polyhydroxyalkanoate resins are described, for example, in U.S. Pat. No. 5,004,664, the disclosure of which is hereby incorporated by reference in entirety.

Commercial polyhydroxyalkanoates resins which may be utilized include BIOPOL™ (commercially available from Imperial Chemical Industries, Ltd (ICI), England), or those sold under the name MIREL™ in solid or emulsion form (commercially available from Metabolix).

In embodiments, a ratio of the parts by weight of the FDCA bio-based polyester resin to the one or more additional resins such as the biobased semi-crystalline or crystalline resin can be from about 100:0 to about 50:50, about 99:1 or about 95:5 to about 70:30 or about 60:40, based on 100 parts by weight of total resin. The ratio may be outside of those ranges.

Colorants

Suitable colorants include those comprising carbon black, such as, REGAL 330® and Nipex 35; magnetites, such as, Mobay magnetites, MO8029™ and MO8060™; Columbian magnetites, MAPICO® BLACK; surface-treated magnetites; Pfizer magnetites, CB4799™, CB5300™, CB5600™ and MCX6369™; Bayer magnetites, BAYFERROX 8600™ and 8610™; Northern Pigments magnetites, NP-604™ and NP-608™; Magnox magnetites, TMB-100™ or TMB-104™; and the like.

Colored pigments, such as, cyan, magenta, yellow, red, orange, green, brown, blue or mixtures thereof may be used. The additional pigment or pigments may be used as water-based pigment dispersions.

Examples of pigments include SUNSPERSE 6000, FLEXIVERSE and AQUATONE, water-based pigment dispersions from SUN Chemicals; HELIOGEN BLUE L6900™, D6840™, D7080™, D7020™, PYLAM OIL BLUE™, PYLAM OIL YELLOW™ and PIGMENT BLUE I™ available from Paul Uhlich & Company, Inc.; PIGMENT VIOLET I™, PIGMENT RED 48™, LEMON CHROME YELLOW DCC 1026™, TOLUIDINE RED™ and BON RED C™ available from Dominion Color Corporation, Ltd., Toronto, Ontario; NOVAPERM YELLOW FGL™ and HOSTAPERM PINK E™ from Hoechst; CINQUASIA MAGENTA™ available from E.I. DuPont de Nemours & Co. and the like.

Examples of magenta pigments include 2,9-dimethyl-substituted quinacridone, an anthraquinone dye identified in the Color Index as CI 60710, CI Dispersed Red 15, a diazo dye identified in the Color Index as CI 26050, CI Solvent Red 19 and the like.

Illustrative examples of cyan pigments include copper tetra (octadecylsulfonamido) phthalocyanine, a copper phthalocyanine pigment listed in the Color Index as CI 74160, CI Pigment Blue, Pigment Blue 15:3, Pigment Blue 15:4, an Anthrazine Blue identified in the Color Index as CI 69810, Special Blue X-2137 and the like.

Illustrative examples of yellow pigments are diarylide yellow 3,3-dichlorobenzidene acetoacetanilide, a monoazo pigment identified in the Color Index as CI 12700, CI Solvent Yellow 16, a nitrophenyl amine sulfonamide identified in the Color Index as Foron Yellow SE/GLN, CI Disperse Yellow 3, 2,5-dimethoxy-4-sulfonanilide phenylazo-4'-chloro-2,5-dimethoxy acetoacetanilide and Permanent Yellow FGL.

Other known colorants may be used, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G 01 (American Hoechst), Sunsperse Blue BHD 6000 (Sun Chemicals), Irgalite Blue BCA (CibaGeigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), SUCD-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like. Other pigments that may be used, and which are commercially available include various pigments in the color classes, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and so on, and combinations thereof.

The colorant, for example carbon black, cyan, magenta and/or yellow colorant, may be incorporated in an amount sufficient to impart the desired color to the toner. In general, pigment or dye, may be employed in an amount ranging from about 2% to about 35% by weight of the toner particles on a solids basis, from about 5% to about 25% by weight, from about 5% to about 15% by weight.

In embodiments, more than one colorant may be present in a toner particle. For example, two colorants may be present in a toner particle, such as, a first colorant of pigment blue, may be present in an amount ranging from about 2% to about 10% by weight of the toner particle on a solids basis, from about 3% to about 8% by weight or from about 5% to about 10% by weight; with a second colorant of pigment yellow that may be present in an amount ranging from about 5% to about 20% by weight of the toner particle on a solids basis, from about 6% to about 15% by weight or from about 10% to about 20% by weight and so on.

Surfactants

In embodiments, toner compositions may be in dispersions including surfactants. Emulsion aggregation methods where the polymer and other components of the toner are in combination may employ one or more surfactants to form an emulsion.

One, two or more surfactants may be used. The surfactants may be selected from ionic surfactants and nonionic surfactants, or combinations thereof. Anionic surfactants and cationic surfactants are encompassed by the term, "ionic surfactants."

The surfactant or the total amount of surfactants may be used in an amount of from about 0.01% to about 5% by weight of the toner-forming composition, from about 0.75% to about 4% by weight of the toner-forming composition, from about 1% to about 3% by weight of the toner-forming composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy)ethanol, for example, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC® PR/F, in embodiments, SYNPERONIC® PR/F 108; and a DOWFAX, available from The Dow Chemical Corp.

Anionic surfactants include sulfates and sulfonates, such as, sodium dodecylsulfate (SDS), sodium dodecylbenzene sulfonate, sodium dodecylnaphthalene sulfate and so on; dialkyl benzenealkyl sulfates; acids, such as, palmitic acid, and NEOGEN or NEOGEN SC obtained from Daiichi Kogyo Seiyaku, and so on, combinations thereof and the like. Other suitable anionic surfactants include, in embodiments, alkyldiphenyloxide disulfonates or TAYCA POWER BN2060 from Tayca Corporation (Japan), which is a branched sodium dodecyl benzene sulfonate. Combinations of those surfactants and any of the foregoing nonionic surfactants may be used in embodiments.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromides, halide salts of quarternized polyoxyethylalkylamines, dodecylbenzyl triethyl ammonium chlorides, MIRAPOL® and ALKAQUAT® available from Alkaril Chemical Company, SANISOL® (benzalkonium chloride) available from Kao Chemicals and the like, and mixtures thereof, including, for example, a nonionic surfactant as known in the art or provided hereinabove.

Waxes

The toners of the instant disclosure, optionally, may contain a wax, which may be either a single type of wax or a mixture of two or more different types of waxes (hereinafter identified as, "a wax"). A wax may be added to a toner formulation or to a developer formulation, for example, to improve particular toner properties, such as, toner particle shape, charging, fusing characteristics, gloss, stripping, offset properties and the like. Alternatively, a combination of waxes may be added to provide multiple properties to a toner or a developer composition. A wax may be included as, for example, a fuser roll release agent.

When included, the wax may be present in an amount of, for example, from about 1 wt % to about 25 wt % of the toner particles, from about 5 wt % to about 20 wt % of the toner particles.

Waxes that may be selected include waxes having, for example, a weight average molecular weight of from about 500 to about 20,000, in embodiments, from about 1,000 to about 10,000. Waxes that may be used include, for example, polyolefins, such as, polyethylene, polypropylene and polybutene waxes, such as, those that are commercially available, for example, POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550-P™, a low weight average molecular weight polypropylene available from Sanyo Kasei K.K.; plant-based waxes, such as, carnauba wax, rice wax, candelilla wax, sumac wax and jojoba oil; animal-based waxes, such as, beeswax; mineral-based waxes and petroleum-based waxes, such as, montan wax, ozokerite, ceresin wax, paraffin wax, microcrystalline wax and Fischer-Tropsch waxes; ester waxes obtained from higher fatty acids and higher alcohols, such as, stearyl stearate and behenyl behenate; ester waxes obtained from higher fatty acids and monovalent or multivalent lower alcohols, such as, butyl stearate, propyl oleate, glyceride monostearate, glyceride distearate and pentaerythritol tetrabehenate; ester waxes obtained from higher fatty acids and multivalent alcohol multimers, such as, diethyleneglycol monostearate, dipropyleneglycol distearate, diglyceryl distearate and triglyceryl tetrastearate; sorbitan higher fatty acid ester waxes, such as, sorbitan monostearate; cholesterol higher fatty acid ester waxes, such as, cholesteryl stearate and so on.

Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson. Mixtures and combinations of the foregoing waxes also may be used in embodiments.

Aggregating Factor

An aggregating factor, when used, may be an inorganic cationic coagulant, such as, for example, polyaluminum chloride (PAC), polyaluminum sulfosilicate (PASS), aluminum sulfate, zinc sulfate, magnesium sulfate and chlorides of magnesium, calcium, zinc, beryllium, aluminum, sodium, other metal halides, including monovalent and divalent halides.

The aggregating factor may be present in an emulsion in an amount of from, for example, from about 0.01% to about 10 wt %, from about 0.05 to about 5 wt % based on the total solids in the toner.

The aggregating factor may also contain minor amounts of other components, for example, nitric acid.

In embodiments, a sequestering agent or chelating agent may be introduced after aggregation is complete to sequester or extract a metal complexing ion, such as, aluminum from the aggregation process. Thus, the sequestering, chelating or complexing agent used after aggregation is complete may comprise an organic complexing component, such as, ethylenediaminetetraacetic acid (EDTA), gluconal, hydroxyl-2, 2'iminodisuccinic acid (HIDS), dicarboxylmethyl glutamic acid (GLDA), methyl glycidyl diacetic acid (MGDA), hydroxydiethyliminodiacetic acid (HIDA), potassium citrate, sodium citrate, nitrotriacetate salt, humic acid, fulvic acid; salts of EDTA, such as, alkali metal salts of EDTA, tartaric acid, oxalic acid, polyacrylates, sugar acrylates, citric acid, polyasparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1,1-diphosphonic acid, aminotrimethylenephosphonic acid, diethylene triaminepentamethylene phosphonic acid, ethylenediamine tetramethylene phosphonic acid and mixtures thereof.

Surface Additive

In embodiments, the toner particles may be mixed with one or more of silicon dioxide or silica ($SiO_2$), titania or titanium dioxide ($TiO_2$) and/or cerium oxide. Silica may be a first silica and a second silica. The first silica may have an average primary particle size, measured in diameter, in the range of, for example, from about 5 nm to about 50 nm, such as, from about 5 nm to about 25 nm or from about 20 nm to about 40 nm. The second silica may have an average primary particle size, measured in diameter, in the range of, for example, from about 100 nm to about 200 nm, from about 100 nm to about 150 nm, from about 125 nm to about 145 nm. The second silica may have a larger average size (diameter) than the first silica. The titania may have an average primary particle size in the range of, for example, about 5 nm to about 50 nm, from about 5 nm to about 20 nm, from about 10 nm to about 50 nm. The cerium oxide may have an average primary particle size in the range of from about 5 nm to about 50 nm, from about 5 nm to about 20 nm, from about 10 nm to about 50 nm.

Zinc stearate also may be used as an external additive. Calcium stearate and magnesium stearate may provide similar functions. Zinc stearate may have an average primary particle size in the range of from about 500 nm to about 700 nm, from about 500 nm to about 600 nm, from about 550 nm to about 650 nm.

Carrier

Carrier particles include those that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, nickel berry carriers as disclosed in U.S. Pat. No. 3,847,604, the entire disclosure of which is hereby incorporated herein by reference, comprised of nodular carrier beads of nickel, characterized by surfaces of reoccurring recesses and protrusions thereby providing particles with a relatively large external area, those disclosed in U.S. Pat. Nos. 4,937,166 and 4,935,326, the disclosure of each of which hereby is incorporated herein by reference, and so on. In embodiments, the carrier particles may have an average particle size of, for example, from about 20 to about 85 μm, from about 30 to about 60 μm, from about 35 to about 50 μm.

Toner Particle Preparation

The toner particles may be prepared by any method within the purview of one skilled in the art, for example, any of the emulsion/aggregation methods may be used with the polyester resin comprising a polyhedral oligomeric silsesquioxane of interest. However, any suitable method of preparing toner particles may be used, including chemical processes, such as, suspension and encapsulation processes disclosed, for example, in U.S. Pat. Nos. 5,290,654 and 5,302,486, the disclosure of each of which hereby is incorporated by reference in entirety; by conventional granulation methods, such as, jet milling; pelletizing slabs of material; other mechanical processes; any process for producing nanoparticles or microparticles; and so on, if a polyester resin comprising a polyhedral oligomeric silsesquioxane of interest is used.

In embodiments relating to an emulsification/aggregation process, a resin may be dissolved in a solvent, and may be mixed into an emulsion medium, for example water, such as, deionized water, optionally containing a stabilizer, and optionally a surfactant. Examples of suitable stabilizers include water-soluble alkali metal hydroxides, such as, sodium hydroxide, potassium hydroxide, lithium hydroxide, beryllium hydroxide, magnesium hydroxide, calcium hydroxide or barium hydroxide; ammonium hydroxide; alkali metal carbonates, such as, sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. When a stabilizer is used, the stabilizer may be present in amounts of from about 0.1% to about 5%, from about 0.5% to about 3% by weight of the resin. When such salts are added to the composition as a stabilizer, in embodiments, incompatible metal salts are not present in the composition, for example, a composition may be completely or essentially free of zinc and other incompatible metal ions, for example, Ca, Fe, Ba etc., that form water-insoluble salts. The term, "essentially free," refers, for example, to the incompatible metal ions as present at a level of less than about 0.01%, less than about 0.005% or less than about 0.001%, by weight of the wax and resin. The stabilizer may be added to the mixture at ambient temperature, or may be heated to the mixture temperature prior to addition.

Optionally, a surfactant may be added to the aqueous emulsion medium, for example, to afford additional stabilization to the resin or to enhance emulsification of the resin. Suitable surfactants include anionic, cationic and nonionic surfactants as taught herein.

Following emulsification, toner compositions may be prepared by aggregating a mixture of a resin, a pigment, an optional wax and any other desired additives in an emulsion, optionally, with surfactants as described above, and then optionally coalescing the aggregate mixture. A mixture may be prepared by adding an optional wax or other materials, which may also be optionally in a dispersion, including a surfactant, to the emulsion comprising a resin-forming material and a pigments, which may be a mixture of two or more emulsions containing the requisite reagents. The pH of the resulting mixture may be adjusted with an acid, such as, for example, acetic acid, nitric acid or the like. In embodiments, the pH of the mixture may be adjusted to from about 2 to about 4.5.

Additionally, in embodiments, the mixture may be homogenized. If the mixture is homogenized, mixing may be at from about 600 to about 4,000 rpm. Homogenization may be by any suitable means, including, for example, an IKA ULTRA TURRAX T50 probe homogenizer.

Aggregation

Following preparation of the above mixture, often, it may be desirable to form larger particles or aggregates, often sized in micrometers, of the smaller particles from the initial polymerization reaction, often sized in nanometers. An aggregating factor may be added to the mixture.

In embodiments, the aggregating factor may be added to the mixture at a temperature that is below the glass transition temperature ($T_g$) of the resin or of a polymer.

The aggregating factor may be added to the mixture components to form a toner in an amount of, for example, from about 0.1 part per hundred (pph) to about 1 pph, from about 0.25 pph to about 0.75 pph.

To control aggregation of the particles, the aggregating factor may be metered into the mixture over time. For example, the factor may be added incrementally into the mixture over a period of from about 5 to about 240 minutes, from about 30 to about 200 minutes.

Addition of the aggregating factor also may be done while the mixture is maintained under stirred conditions, in embodiments, from about 50 rpm to about 1,000 rpm, in embodiments, from about 100 rpm to about 500 rpm; and at a temperature that is below the $T_g$ of the resin or polymer, in embodiments, from about 30° C. to about 90° C., in embodiments, from about 35° C. to about 70° C. Growth and shaping of the particles following addition of the aggregation factor may be accomplished under any suitable condition(s).

The particles may be permitted to aggregate until a predetermined desired particle size is obtained. Particle size may be monitored during the growth process. For example, samples may be taken during the growth process and analyzed, for example, with a COULTER COUNTER, for average particle size. The aggregation thus may proceed by maintaining the mixture, for example, at elevated temperature, or slowly raising the temperature, for example, from about 40° C. to about 100° C., and holding the mixture at that temperature for from about 0.5 hours to about 6 hours, in embodiments, from about hour 1 to about 5 hours, while maintaining stirring, to provide the desired aggregated particles. Once the predetermined desired particle size is attained, the growth process is halted.

The characteristics of the toner particles may be determined by any suitable technique and apparatus. Volume average particle diameter and geometric standard deviation may be measured using an instrument, such as, a BECKMAN COULTER MULTISIZER 3, operated in accordance with the instructions of the manufacturer.

Once the desired final size of the toner particles or aggregates is achieved, the pH of the mixture may be adjusted with base to a value of from about 6 to about 10, from about 6.2 to about 7. The adjustment of pH may be used to freeze, that is, to stop, toner particle growth. The base used to stop toner particle growth may be, for example, an alkali metal hydroxide, such as, for example, sodium hydroxide, potassium hydroxide, ammonium hydroxide, combinations thereof and the like. In embodiments, EDTA may be added to assist adjusting the pH to the desired value.

The base may be added in amounts from about 2 to about 25% by weight of the mixture, from about 4 to about 10% by weight of the mixture. Following aggregation to the desired particle size, with the formation of an optional shell as described herein, the particles then may be coalesced to the desired final shape.

In embodiments, the aggregate particles may be of a size of less than about 6 µm, less than about 5 µm, less than about 4 µm.

Coalescence

Following aggregation to a desired particle size and application of any optional shell, the particles then may be coalesced to a desired final shape, such as, a circular shape, for example, to correct for irregularities in shape and size, the coalescence being achieved, for example, by heating the mixture to a temperature from about 45° C. to about 100° C., from about 55° C. to about 99° C., which may be at or above the $T_g$ of the resin(s) used to form the toner particles or can be lower than the melting point of the resin(s), and/or reducing the stirring, for example, from about 1000 rpm to about 100 rpm, from about 800 rpm to about 200 rpm. Coalescence may be conducted over a period from about 0.01 to about 9 hours, from about 0.1 to about 4 hours, see, for example, U.S. Pat. No. 7,736,831. Higher or lower temperatures may be used, it being understood that the temperature is a function of the polymer(s) used for the core and/or shell.

Optionally, a coalescing agent may be used. Examples of suitable coalescence agents include, but are not limited to, benzoic acid alkyl esters, ester alcohols, glycol/ether-type solvents, long chain aliphatic alcohols, aromatic alcohols, mixtures thereof and the like. Examples of benzoic acid alkyl esters include those where the alkyl group, which may be straight or branched, substituted or unsubstituted, has from about 2 to about 30 carbon atoms, such as, decyl or isodecyl benzoate, nonyl or isononyl benzoate, octyl or isooctyl benzoate, 2-ethylhexyl benzoate, tridecyl or isotridecyl benzoate, 3,7-dimethyloctyl benzoate, 3,5,5-trimethylhexyl benzoate, mixtures thereof and the like. Examples of such benzoic acid alkyl esters include VELTA® 262 (isodecyl benzoate) and VELTA® 368 (2-ethylhexyl benzoate) available from Velsicol Chemical Corp. Examples of ester alcohols include hydroxyalkyl esters of alkanoic acids, where the alkyl group, which may be straight or branched, substituted or unsubstituted, and may have from about 2 to about 30 carbon atoms, such as, 2,2,4-trimethylpentane-1,3-diol monoisobutyrate. An example of an ester alcohol is TEXANOL® (2,2,4-trimethylpentane-1,3-diol monoisobutyrate) available from Eastman Chemical Co. Examples of glycol/ether-type solvents include diethylene glycol monomethylether acetate, diethylene glycol monobutylether acetate, butyl carbitol acetate (BCA) and the like. Examples of long chain aliphatic alcohols include those where the alkyl group is from about 5 to about 20 carbon atoms, such as, ethylhexanol, octanol, dodecanol and the like. Examples of aromatic alcohols include benzyl alcohol and the like.

In embodiments, the coalescence agent (or coalescing agent or coalescence aid agent) evaporates during later stages of the emulsion/aggregation process, such as, during a second heating step, that is, generally above the $T_g$ of the resin or a polymer. The final toner particles are thus, free of, or essentially or substantially free of any remaining coalescence agent. To the extent that any remaining coalescence agent may be present in a final toner particle, the amount of remaining coalescence agent is such that presence thereof does not affect any properties or the performance of the toner or developer.

The coalescence agent may be added prior to the coalescence or fusing step in any desired or suitable amount. For example, the coalescence agent may be added in an amount of from about 0.01 to about 10% by weight, based on the solids content in the reaction medium, from about 0.05, from about 0.1%, to about 0.5, to about 3.0% by weight, based on the solids content in the reaction medium. Of course, amounts outside those ranges may be used, as desired.

In embodiments, the coalescence agent may be added at any time between aggregation and coalescence, although in some embodiments it may be desirable to add the coalescence agent after aggregation is, "frozen," or completed, for example, by adjustment of pH, for example, by addition, for example, of base.

Coalescence may proceed and be accomplished over a period of from about 0.1 to about 9 hours, in embodiments, from about 0.5 to about 4 hours.

After coalescence, the mixture may be cooled to room temperature, such as, from about 20° C. to about 25° C. The cooling may be rapid or slow, as desired. A suitable cooling method may include introducing cold water in a jacket around the reactor. After cooling, the toner particles optionally may be washed with water and then dried. Drying may be accomplished by any suitable method for drying including, for example, freeze drying.

Shells

In embodiments, an optional shell may be applied to the formed toner particles, aggregates or coalesced particles. Any polymer, including those described above as suitable for the core, may be used for the shell. The shell polymer may be applied to the particles or aggregates by any method within the purview of those skilled in the art.

In embodiments, an amorphous polyester resin may be used to form a shell over the particles or aggregates to form toner particles or aggregates having a core-shell configuration. In some embodiments, a low molecular weight amorphous polyester resin may be used to form a shell over the particles or aggregates.

The formation of the shell over the aggregated particles may occur while heating to a temperature from about 30° C. to about 80° C., from about 35° C. to about 70° C. Formation of the shell may take place for a period of time from about 5 minutes to about 10 hours, from about 10 minutes to about 5 hours.

The shell polymer may be present in an amount of from about 1% to about 80% by weight of the toner particles or aggregates, from about 10% to about 50% by weight of the toner particles or aggregates.

Optional Additives

The toner may include any known charge additives in amounts of from about 0.1 to about 10 weight %, from about 0.5 to about 7 weight % of the toner. Examples of such charge additives include alkyl pyridinium halides, bisulfates, the charge control additives of U.S. Pat. Nos. 3,944,493; 4,007,293; 4,079,014; 4,394,430; and 4,560,635, the disclosure of each of which hereby is incorporated by reference in entirety, negative charge enhancing additives, such as, aluminum complexes, and the like.

Charge enhancing molecules may be used to impart either a positive or a negative charge on a toner particle. Examples include quaternary ammonium compounds, see, for example, U.S. Pat. No. 4,298,672, organic sulfate and sulfonate compounds, see for example, U.S. Pat. No. 4,338,390, cetyl pyridinium tetrafluoroborates, distearyl dimethyl ammonium methyl sulfate, aluminum salts and so on.

Surface Modifications

Surface additives may be added to the toner compositions of the present disclosure, for example, after washing or drying. Examples of such surface additives include, for example, one or more of a metal salt, a metal salt of a fatty acid, a colloidal silica, a metal oxide, such as, $TiO_2$ (for example, for improved RH stability, tribo control and improved development and transfer stability), an aluminum oxide, a cerium oxide, a strontium titanate, $SiO_2$, mixtures thereof and the like. Examples of such additives include those disclosed in U.S. Pat. Nos. 3,590,000; 3,720,617; 3,655,374; and 3,983,045, the disclosure of each of which hereby is incorporated by reference in entirety.

Surface additives may be used in an amount of from about 0.1 to about 10 wt %, from about 0.5 to about 7 wt % of the toner.

Other surface additives include lubricants, such as, a metal salt of a fatty acid (e.g., zinc or calcium stearate) or long chain alcohols, such as, UNILIN 700, available from Baker Petrolite, and AEROSIL R972®, available from Degussa. The coated silicas of U.S. Pat. Nos. 6,190,815 and 6,004,714, the disclosure of each of which hereby is incorporated by reference in entirety, also may be present. The additive may be present in an amount of from about 0.05 to about 5%, from about 0.1 to about 2% of the toner, which additives may be added during the aggregation or blended into the formed toner product.

The gloss of a toner may be influenced by the amount of retained metal ion, such as, $Al^{3+}$, in a particle. The amount of retained metal ion may be adjusted further by the addition of a chelator, such as, EDTA. In embodiments, the amount of retained catalyst, for example, $Al^{3+}$, in toner particles of the present disclosure may be from about 0.1 pph to about 1 pph, from about 0.25 pph to about 0.8 pph. The gloss level of a toner of the instant disclosure may have a gloss, as measured by Gardner gloss units (gu), of from about 20 gu to about 100 gu, from about 50 gu to about 95 gu, from about 60 gu to about 90 gu.

Toners may possess suitable charge characteristics when exposed to extreme relative humidity (RH) conditions. The low humidity zone (C zone) may be about 10° C. and 15% RH, while the high humidity zone (A zone) may be about 28° C. and 85% RH.

Toners of the instant disclosure also may possess a parent toner charge per mass ratio (q/m) of from about −5 μC/m to about −90 μC/g, and a final toner charge after surface additive blending of from about −15 μC/g to about −80 μC/g.

Other desirable characteristics of a toner include storage stability, particle size integrity, high rate of fusing to the substrate or receiving member, sufficient release of the image from the photoreceptor, nondocument offset, use of smaller-sized particles and so on, and such characteristics may be obtained by including suitable reagents, suitable additives or both, and/or preparing the toner with particular protocols.

The dry toner particles, exclusive of external surface additives, may have the following characteristics: (1) volume average diameter (also referred to as "volume average particle diameter") of from about 2.5 to about 20 μm, from about 2.75 to about 10 μm, from about 3 to about 7.5 μm; (2) number average geometric standard deviation (GSDn) and/or volume average geometric standard deviation (GSDv) of from about 1.18 to about 1.30, from about 1.21 to about 1.24; and (3) circularity of from about 0.9 to about 1.0 (measured with, for example, a Sysmex FPIA 2100 analyzer), from about 0.95 to about 0.985, from about 0.96 to about 0.98.

Developers

The toner particles thus formed may be formulated into a developer composition. For example, the toner particles may be mixed with carrier particles to achieve a two component developer composition. The toner concentration in the developer may be from about 1% to about 25% by weight of the total weight of the developer, from about 2% to about 15% by weight of the total weight of the developer, with the remainder of the developer composition being the carrier. However, different toner and carrier percentages may be used to achieve a developer composition with desired characteristics.

Carrier

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, such as, polyvinylidene fluorides, terpolymers of styrene, methyl methacrylates, silanes, such as, triethoxy silanes, tetrafluoroethylenes, other known coatings and the like. For example, coatings containing polyvinylidenefluoride, available, for example, KYNAR 301F™, and/or polymethylmethacrylate (PMMA), for example, having a weight average molecular weight of about 300,000 to about 350,000, such as, commercially available from Soken, may be used. In embodiments, PMMA and polyvinylidenefluoride may be mixed in proportions of from about 30 to about 70 wt % to about 70 to about 30 wt %, from about 40 to about 60 wt % to about 60 to about 40 wt %. The coating may have a coating weight of, for example, from about 0.1 to about 5% by weight of the carrier, from about 0.5 to about 2% by weight of the carrier.

Various effective suitable means may be used to apply the polymer to the surface of the carrier core, for example, cascade roll mixing, tumbling, milling, shaking, electrostatic powder cloud spraying, fluidized bed mixing, electrostatic disc processing, electrostatic curtain processing, combinations thereof and the like. The mixture of carrier core particles and polymer then may be heated to enable the polymer to melt and to fuse to the carrier core. The coated carrier particles then may be cooled and thereafter classified to a desired particle size.

The carrier particles may be prepared by mixing the carrier core with polymer in an amount from about 0.05 to about 10% by weight, from about 0.01 to about 3% by weight, based on the weight of the coated carrier particle, until adherence thereof to the carrier core is obtained, for example, by mechanical impaction and/or electrostatic attraction.

In embodiments, suitable carriers may include a steel core, for example, of from about 25 to about 100 μm in size, from about 50 to about 75 μm in size, coated with about 0.5% to about 10% by weight, from about 0.7% to about 5% by weight of a polymer mixture including, for example, methylacrylate and carbon black, using the process described, for example, in U.S. Pat. Nos. 5,236,629 and 5,330,874.

Devices Comprising a Toner Particle

Toners and developers may be combined with a number of devices ranging from enclosures or vessels, such as, a vial, a bottle, a flexible container, such as a bag or a package, and so on, to devices that serve more than a storage function.

The toner compositions and developers of interest may be incorporated into devices dedicated, for example, to delivering same for a purpose, such as, forming an image. Hence, particularized toner delivery devices are known, see, for example, U.S. Pat. No. 7,822,370, and may contain a toner preparation or developer of interest. Such devices include cartridges, tanks, reservoirs and the like, and may be replaceable, disposable or reusable. Such a device may comprise a storage portion; a dispensing or delivery portion; and so on; along with various ports or openings to enable toner or developer addition to and removal from the device; an optional portion for monitoring amount of toner or developer in the device; formed or shaped portions to enable siting and seating of the device in, for example, an imaging device; and so on.

A toner or developer of interest may be included in a device dedicated to delivery thereof, for example, for recharging or refilling toner or developer in an imaging device component, such as, a cartridge, in need of toner or developer, see, for example, U.S. Pat. No. 7,817,944, wherein the imaging device component may be replaceable or reusable.

Imaging Devices

The toners or developers may be used for electrostatographic or electrophotographic processes, including those disclosed in U.S. Pat. No. 4,295,990, the disclosure of which hereby is incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

Imaging processes include, for example, preparing an image with an electrophotographic device including, for example, one or more of a charging component, an imaging component, a photoconductive component, a developing component, a transfer component, a fusing component and so on. The electrophotographic device may include a high speed printer, a color printer and the like.

Once the image is formed with toners/developers via a suitable image development method, such as any of the aforementioned methods, the image then may be transferred to an image receiving medium or substrate, such as, a paper and the like. In embodiments, the fusing member or component, which may be of any desired or suitable configuration, such as, a drum or roller, a belt or web, a flat surface or platen, or the like, may be used to set the toner image on the substrate. Optionally, a layer of a liquid, such as, a fuser oil may be applied to the fuser member prior to fusing.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

The following Examples illustrate embodiments of the instant disclosure. The Examples are intended to be illustrative only and are not intended to limit the scope of the present disclosure. Parts and percentages are by weight unless otherwise indicated. As used herein, "room temperature," (RT) refers to a temperature of from about 20° C. to about 30° C.

EXAMPLES

Polyester Resin Synthesis

Experimental Resin I

Step 1: A 1 liter Parr reactor equipped with a mechanical stirrer and bottom drain valve was charged with 85% purity abietic acid (1000 mmol, 1.0 eq, 302 g), glycerin carbonate (1085 mmol, 1.0845 eq, 128 g) and 2-methyl-1H-imidazole catalyst (6.0 mmol, 0.006 eq, 0.493 g). The reactor was blanketed with nitrogen and the temperature of the reactor was slowly raised to 175° C. with stirring (once the solids melted). After 5 hours, a sample was taken for acid value analysis to ensure complete reaction of abietic acid with glycerin carbonate. The temperature was lowered to 110° C. with slow agitation overnight under a nitrogen blanket.

Step 2: On the next day, the set point of the reactor was increased to 150° C. and the remaining monomers were charged into the reactor as shown in table below. DDSA is dodecenyl succinic anhydride. The rosin-diol is the product formed in Step 1.

TABLE 1

Biobased Polyester Components for Experimental Resin I

| | Reactant | MW | Eq | Moles (mmol) | Reactant Mass (g) |
|---|---|---|---|---|---|
| 1 | Rosin-diol | 376 | 1.000 | 1000 | 376.0 |
| 2 | hexane-1,6-diol | 118.174 | 0.59 | 590 | 69.7 |
| 3 | DDSA | 266.38 | 0.30 | 300 | 80.0 |
| 4 | 2,5-furandioic acid | 156.09 | 1.20 | 1200 | 187.0 |
| 5 | Fascat 4100 | 208.83 | 0.002 | 4.8 | 1.002 |

A distillation apparatus was attached to the reaction vessel and the reaction temperature was slowly increased to 205° C. The reactor contents was stirred at 280 rpm and held at 205° C. for 8.5 hours over 2 days. The overnight temperature was lowered to 185-190° C. Once the softening point (Ts) reached 110.4° C., the reaction temperature was lowered to 190° C. and the resin was discharged onto a polytetrafluoroethylene (Teflon) pan.

The first step (1) and final results of the polymerization are shown in Table 2 below, n/m indicates the measurement was not made.

TABLE 2

Step 1 and 2 results of FDCA-biobased resin

| Step | Ts (° C.) | AV | Mw | Mn | PDI | Tg(on) | Tg(mid) | Tg(off) |
|---|---|---|---|---|---|---|---|---|
| 1 | n/m | 1.55 | 3352 | 1297 | 2.59 | 42.4 | 46.8 | 51.2 |
| 2 | 110.4 | 10.7 | 11048 | 1967 | 5.62 | 51.2 | 56.4 | 61.5 |

The above experiment was repeated with formulation adjustments to increase Tg a few degrees Celsius (Experimental Resin II below) by decreasing the hexane-1,6 diol (HD) from 0.59 mole equivalents (mol-eq) to 0.548 (mol-eq) and the FDCA was increased from 1.20 to 1.33 (mol-eq).

Experimental Resin II

Step 1: A 1 liter Parr reactor equipped with a mechanical stirrer and bottom drain valve was charged with 85% purity abietic acid (1000 mmol, 1.0 eq, 302 g), glycerin carbonate (1085 mmol, 1.0845 eq, 128 g) and 2-methyl-1H-imidazole catalyst (6.0 mmol, 0.006 eq, 0.493 g). The reactor was blanketed with nitrogen and the temperature of the reactor was slowly raised to 175° C. with stirring (once the solids melted). After 6 hours, a sample was taken for acid value analysis to ensure complete reaction of abietic acid with glycerin carbonate. The temperature was held at 175° C. under a nitrogen blanket before proceeding to Step 2.

Step 2: The remaining monomers as seen in Table 3 below were charged into the reactor with a distillation apparatus attached and heated to 205° C. and held there for 20 hours.

TABLE 3

Biobased Polyester Components of Experimental Resin II

| | Reactant | MW | Eq | Moles (mmol) | Reactant Mass (g) |
|---|---|---|---|---|---|
| 1 | Rosin-diol | 376 | 1.000 | 1000 | 376 |
| 2 | hexane-1,6-diol | 118.174 | 0.548 | 548 | 64.8 |
| 3 | DDSA | 266.38 | 0.3 | 300 | 80 |
| 4 | 2,5-furandioic acid | 156.09 | 1.33 | 1326 | 207 |
| 5 | Fascat 4100 | 208.83 | 2.000 | 0.418 | 1.002 |

The temperature was then increased to 210° C. and held there for 3.5 hours. The temperature increased to 215° C. for 1 hour and then to 220° C. for 6.5 hours. The final temperature increase was to 225° C. for 10 hours. The Ts reached 113.5° C. and the reaction temperature was lowered to 175° C. so that the resin may be discharged onto a polytetrafluoroethylene (Teflon) pan.

Two control BPA-containing resins were used having the following composition:

| Control I | |
|---|---|
| Monomer | Mole % |
| Terephthalic Acid | 25.5 |
| Dodecylsuccinic Acid | 21 |
| Trimellitic Acid | 3.5 |
| Propoxylated Bisphenol A | 40 |
| Ethoxylated Bisphenol A | 10 |

| Control IIa | |
|---|---|
| Monomer | Mole % |
| Terephthalic Acid | 24 |
| Fumaric Acid | 16 |
| Dodecylsuccinic Acid | 10 |
| Propoxylated Bisphenol A | 50 |

Table 4 below shows properties of the two FDCA-based resins as compared to the two BPA-based resins (Control 1 and Control IIa) and a second BPA resin with terephthalic acid (TPA) (Control IIb) and a BPA resin with isophthalic acid (iPA) (Control III) as the diacid component.

The FDCA-based resins had very similar properties to the Control IIa resin which is used commercially.

TABLE 4

Properties of Experimental and Control Resins.

| Resin | Description | Ts (° C.) | Acid Value | Mw | Mn | PDI | $Tg_{(on)}$ | $Tg_{(mid)}$ | $Tg_{(off)}$ |
|---|---|---|---|---|---|---|---|---|---|
| Experimental I | FDCA-based | 110.40 | 10.7 | 11048 | 1967 | 5.62 | 51.2 | 56.4 | 61.5 |
| Experimental II | FDCA-based, improved formulation | 113.50 | 12.1 | 18378 | 2072 | 8.87 | 52.5 | 57.5 | 62.5 |
| Control III | Isophthalic acid-based | 112.10 | 13.5 | 17507 | 22292 | 7.64 | 53.5 | 57.9 | 62.2 |
| Control IIb | Terephthalic acid-based | 114.00 | 26.0 | 16128 | 1994 | 4.98 | 55.3 | 59.8 | 64.3 |
| Control I | BPA-containing resin | 129.00 | 12.0 | 105160 | 5150 | 20.42 | 55.7 | 59.1 | 62.5 |
| Control IIa | BPA-containing resin | 118.00 | 14.7 | 16470 | 4350 | 3.79 | 58.8 | 62.1 | 65.5 |

Rheology of the furan-containing resins demonstrated good transition of viscosity from low to high temperatures, for example, from about 50° C. to about 190° C., characteristic of amorphous resins used in commercially available EA toner. The complex viscosity or shear of the two experimental resins is perfectly in-line with that of the Control IIa resin over that temperature range. The elasticity or storage modulus (G') of the two experimental resins is comparable to that of the Control IIa resin over that temperature range. Similarly, the viscous nature or loss modulus (G") of the two experimental resins is substantially the same as that of the Control IIa resin over that temperature range.

Preparation of Toner from Experimental Resin II

Into a 2 liter glass reactor equipped with an overhead mixer was added 175.5 g resin Experimental Resin II emulsion (26.0 wt %), 17.75 g crystalline resin emulsion (35.17 wt %), 27.74 g IGI wax dispersion (29.93 wt %) and 31.35 g cyan pigment PB15:3 (17.21 wt %). Separately, 0.81 g $Al_2(SO_4)_3$ (27.85 wt %) were added as flocculent, under homogenization. The mixture was heated to 42.9° C. to aggregate the particles while stirring at rpm 300 rpm. The particle size was monitored with a COULTER COUNTER until the core particles reached a volume average particle size of 4.49 μm, and then 96.92 g of above mentioned Experimental Resin II emulsion were added as shell material, resulting in a core-shell particle with an average particle size of 6.02 μm and GSDv of 1.36. Thereafter, the pH of the reaction slurry was increased to 7.5 using 4 wt % NaOH solution followed by 1.73 g EDTA (39 wt %) to freeze toner growth. After freezing, the reaction mixture was heated to 85.8° C., and pH was reduced to 6.48 using pH 5.7 acetic acid/sodium acetate (HAc/NaAc) buffer solution for coalescence. The toner was quenched after coalescence, resulting in a final particle size of 5.77 μm, GSDv of 1.30 and GSDn of 1.33. The toner slurry was then cooled to room temperature, separated by sieving (25 mm), filtration, followed by washing and freeze drying.

Thus, 2,5-furan dicarboxylic acid (FDCA) is an equivalent replacement for terephthalic acid (TPA) or isophthalic acid (iPA) in polyester bioresins.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A method of making a bio-based polyester resin for making toner comprising polycondensing a polyol with a polyacidic furan, optionally in the presence of a catalyst to form the bio-based polyester resin for making toner, wherein said polyol comprises a rosin diol, wherein said rosin diol is obtained by reacting a rosin acid and glycerol carbonate, in the presence of a catalyst comprising 2-methyl-1H-imidazole, wherein the polyacidic furan is obtained from a bio-based product.

2. The method of claim 1, wherein the molar ratio of polyacidic furan to polyol is from about 1.2:1 to about 1.3:1.

3. The method of claim 1, wherein the polyacidic furan comprises furan dicarboxylic acid.

4. The method of claim 1, wherein the polyacidic furan comprises 2,5-furan dicarboxylic acid obtained from fructose.

5. The method of claim 1, wherein the bio-based polyester resin for making toner comprises a Tg of between about 10° C. to about 120° C.

6. The method of claim 1, wherein the bio-based polyester resin for making toner comprises a Ts of between about 90° C. to about 150° C.

7. The method of claim 1, wherein the bio-based polyester resin for making toner comprises an acid value (AV) of between about 2 to about 30 mg KOH/g of resin.

8. The method of claim 1, wherein said polyacidic furan is obtained from fructose.

9. The method of claim 1, wherein said rosin acid comprises abietic acid.

* * * * *